United States Patent
Hooli

(10) Patent No.: US 11,838,241 B2
(45) Date of Patent: Dec. 5, 2023

(54) HARQ-ACK BUNDLING FOR TYPE 1 CODEBOOK WITH MULTI-SLOT SCHEDULING

(71) Applicant: NOKIA TECHNOLOGIES OY, Espoo (FI)

(72) Inventor: Kari Juhani Hooli, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 350 days.

(21) Appl. No.: 17/395,253

(22) Filed: Aug. 5, 2021

(65) Prior Publication Data

US 2023/0045728 A1 Feb. 9, 2023

(51) Int. Cl.
*H04L 5/00* (2006.01)
*H04L 1/1812* (2023.01)
*H04W 72/1273* (2023.01)

(52) U.S. Cl.
CPC .......... *H04L 5/0055* (2013.01); *H04L 1/1812* (2013.01); *H04W 72/1273* (2013.01)

(58) Field of Classification Search
CPC ... H04L 5/0055; H04L 1/1812; H04L 1/1896; H04L 1/1854; H04L 1/1861; H04W 72/1273
See application file for complete search history.

(56) References Cited

U.S. PATENT DOCUMENTS

| | | |
|---|---|---|
| 2019/0312713 A1 | 10/2019 | Yang et al. |
| 2020/0351955 A1 | 11/2020 | Jeon et al. |
| 2021/0143970 A1 | 5/2021 | Xu et al. |
| 2021/0218504 A1 | 7/2021 | Wang et al. |

(Continued)

FOREIGN PATENT DOCUMENTS

| | | |
|---|---|---|
| CN | 111314040 A | 6/2020 |
| NO | 2021/026863 A1 | 2/2021 |
| WO | 2021/088751 A1 | 5/2021 |

OTHER PUBLICATIONS

Fujitsu, "Considerations on multi-PDSCH/PUSCH with a single DCI and HARQ for NR from 52.6 GHz to 71 GHz", 3GPP TSG RAN WG1 #105-3, R1-2105062, e-Meeting, May 10-27, 2021, 13 pages.

(Continued)

*Primary Examiner* — Abdullahi Ahmed
(74) *Attorney, Agent, or Firm* — SQUIRE PATTON BOGGS (US) LLP

(57) ABSTRACT

A method may include determining a slot for hybrid automatic repeat request feedback based on one or more downlink assignments. The method may also include determining one or more sets of communication channels with associated start and length indicators for which hybrid automatic repeat requests will be bundled based on a resource assignment table and a hybrid automatic repeat request bundling configuration parameter. The method may further include determining one or more sets of candidate communication channel slots based on K1 values and the resource assignment table. Further, the method may include selecting a start and length indicator for each communication channel set from a corresponding resource assignment row. The method may also include removing unselected start and length indicators and candidate communication channel slots without a selected start and length indicator.

24 Claims, 8 Drawing Sheets

(56) References Cited

U.S. PATENT DOCUMENTS

| | | | |
|---|---|---|---|
| 2021/0218539 A1 | 7/2021 | Hu et al. | |
| 2021/0288757 A1* | 9/2021 | Jacobsen | H04B 7/0456 |
| 2022/0116158 A1* | 4/2022 | Park | H04L 1/1825 |
| 2023/0045728 A1* | 2/2023 | Hooli | H04L 1/1861 |
| 2023/0239082 A1* | 7/2023 | Choi | H04W 72/1273 |
| | | | 370/329 |
| 2023/0239886 A1* | 7/2023 | Kim | H04L 5/0094 |
| | | | 370/336 |
| 2023/0254095 A1* | 8/2023 | Choi | H04L 5/0055 |
| | | | 370/329 |
| 2023/0276448 A1* | 8/2023 | Yang | H04L 5/00 |
| | | | 370/329 |

OTHER PUBLICATIONS

Moderator (LG Electronics), Summary #1 of PDSCH/PUSCH enhancements (Scheduling/HARQ), 3GPP TSG RAN WG1 #105-e, R1-2105422, e-Meeting, May 10-27, 2021, 54 pages.

Andreas Hoglung et al., "Overview of 3GPP Release 14 Further Enhanced MTC", IOT and Machine-type Communication, IEEE Communications Standards Magazine, Jun. 2018, DOI: 10.1109/MCOMSTD.2018.1700050, 6 pages.

Qualcomm et al: "Study on supporting NR from 52.6 GHz to 71 GHz", 3GPP Draft; RP-211267, 3rd Generation Partnership Project (3GPP), Mobile Competence Centre ; 650, Route Des Lucioles ; F-06921 Sophia-Antipolis Cedex ; France vol. TSG RAN, No. Electronic Meeting; Jun. 14, 2020-Jun. 18, 2020 Jun. 7, 2021 (Jun. 7, 2021).

Extended European Search Report dated Dec. 21, 2022, corresponding to European Patent Application No. 22183018.5.

* cited by examiner

HARQ-ACK BUNDLING FOR TYPE 1 CODEBOOK WITH MULTI-SLOT SCHEDULING

FIELD

Some example embodiments may generally relate to mobile or wireless telecommunication systems, such as Long Term Evolution (LTE) or fifth generation (5G) new radio (NR) access technology, or other communications systems. For example, certain example embodiments may relate to apparatuses, systems, and/or methods for hybrid automatic repeat request (HARQ) acknowledgement (ACK) bundling for type 1 codebook with multi-slot scheduling.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the Internet of Things (IoT).

SUMMARY

Some example embodiments may be directed to a method. The method may include determining a slot for hybrid automatic repeat request feedback based on one or more downlink assignments. The method may also include determining one or more sets of communication channels with associated start and length indicators for which hybrid automatic repeat requests will be bundled based on a resource assignment table and a hybrid automatic repeat request bundling configuration parameter. The method may further include determining one or more sets of candidate communication channel slots based on K1 values and the resource assignment table. In addition, the method may include selecting a start and length indicator for each communication channel set from a corresponding resource assignment row. Further, the method may include removing unselected start and length indicators and candidate communication channel slots without a selected start and length indicator.

Other example embodiments may be directed to an apparatus. The apparatus may include at least one processor and at least one memory including computer program code. The at least one memory and computer program code may also be configured to, with the at least one processor, cause the apparatus at least to determine a slot for hybrid automatic repeat request feedback based on one or more downlink assignments. The apparatus may also be caused to determine one or more sets of communication channels with associated start and length indicators for which hybrid automatic repeat requests will be bundled based on a resource assignment table and a hybrid automatic repeat request bundling configuration parameter. The apparatus may further be caused to determine one or more sets of candidate communication channel slots based on K1 values and the resource assignment table. In addition, the apparatus may be caused to select a start and length indicator for each communication channel set from a corresponding resource assignment row. Further, the apparatus may be caused to remove unselected start and length indicators and candidate communication channel slots without a selected start and length indicator.

Other example embodiments may be directed to an apparatus. The apparatus may include means for determining a slot for hybrid automatic repeat request feedback based on one or more downlink assignments. The apparatus may also include means for determining one or more sets of communication channels with associated start and length indicators for which hybrid automatic repeat requests will be bundled based on a resource assignment table and a hybrid automatic repeat request bundling configuration parameter. The apparatus may further include means for determining one or more sets of candidate communication channel slots based on K1 values and the resource assignment table. In addition, the apparatus may include means for selecting a start and length indicator for each communication channel set from a corresponding resource assignment row. Further, the apparatus may include means for removing unselected start and length indicators and candidate communication channel slots without a selected start and length indicator.

In accordance with other example embodiments, a non-transitory computer readable medium may be encoded with instructions that may, when executed in hardware, perform a method. The method may include determining a slot for hybrid automatic repeat request feedback based on one or more downlink assignments. The method may also include determining one or more sets of communication channels with associated start and length indicators for which hybrid automatic repeat requests will be bundled based on a resource assignment table and a hybrid automatic repeat request bundling configuration parameter. The method may further include determining one or more sets of candidate communication channel slots based on K1 values and the resource assignment table. In addition, the method may include selecting a start and length indicator for each communication channel set from a corresponding resource assignment row. Further, the method may include removing unselected start and length indicators and candidate communication channel slots without a selected start and length indicator.

Other example embodiments may be directed to a computer program product that performs a method. The method may include determining a slot for hybrid automatic repeat request feedback based on one or more downlink assignments. The method may also include determining one or more sets of communication channels with associated start and length indicators for which hybrid automatic repeat requests will be bundled based on a resource assignment table and a hybrid automatic repeat request bundling configuration parameter. The method may further include determining one or more sets of candidate communication channel slots based on K1 values and the resource assignment table. In addition, the method may include selecting a start and length indicator for each communication channel set from a corresponding resource assignment row. Further, the method may include removing unselected start and length indicators and candidate communication channel slots without a selected start and length indicator.

Other example embodiments may be directed to an apparatus that may include circuitry configured to determine a slot for hybrid automatic repeat request feedback based on one or more downlink assignments. The apparatus may also include circuitry configured to determine one or more sets of communication channels with associated start and length indicators for which hybrid automatic repeat requests will be bundled based on a resource assignment table and a hybrid automatic repeat request bundling configuration parameter. The apparatus may further include circuitry configured to determine one or more sets of candidate communication channel slots based on K1 values and the resource assignment table. In addition, the apparatus may include circuitry configured to select a start and length indicator for each communication channel set from a corresponding resource assignment row. Further, the apparatus may include circuitry configured to remove unselected start and length indicators and candidate communication channel slots without a selected start and length indicator.

BRIEF DESCRIPTION OF THE DRAWINGS

For proper understanding of example embodiments, reference should be made to the accompanying drawings, wherein.

DETAILED DESCRIPTION

Figure 1:
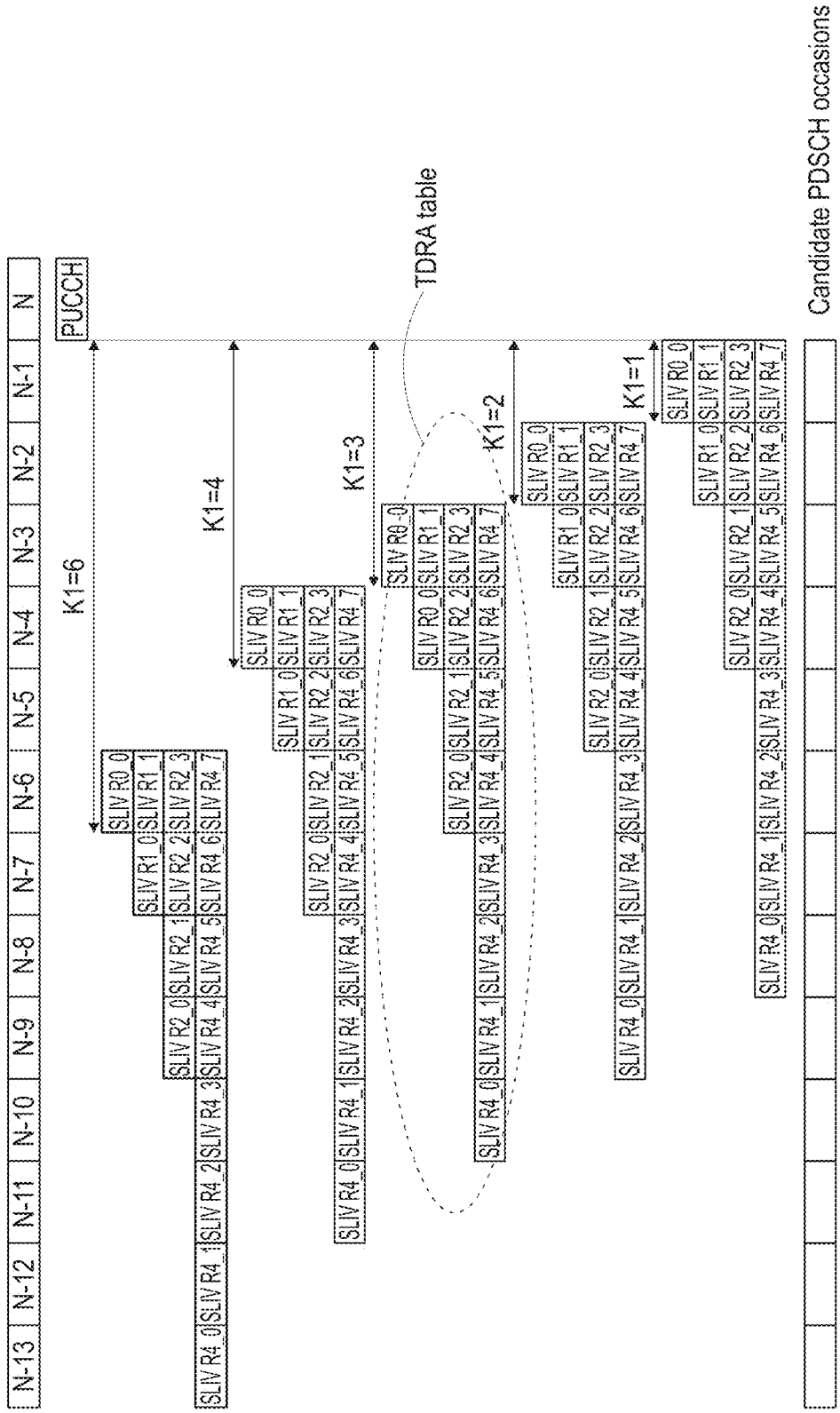
FIG. 1 illustrates an example candidate physical downlink shared channel (PDSCH) occasion determination.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for hybrid automatic repeat request (HARQ) acknowledgement (ACK) bundling for type 1 codebook with multi-slot scheduling.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

3rd Generation Partnership Project (3GPP) has considered support enhancements for multi-physical downlink shared channel/physical uplink shared channel (PDSCH/PUSCH) scheduling and HARQ support with a single downlink control information (DCI). In other words, 3GPP has introduced scheduling of multiple PDSCHs with a single DCI. As such, this has created a need to enhance correspondingly PDSCH HARQ-ACK reporting, and especially HARQ-ACK codebook (CB) determination.

3GPP has considered CBs 1 and 2. Specifically, for Type 1 CB, for enhancements of generating type-1 HARQ-ACK CB corresponding to DCI that can schedule multiple PDSCHs, the set of candidate PDSCH reception occasions corresponding to an uplink (UL) slot with HARQ-ACK transmission may be determined based on a set of downlink (DL) slots. Further, the HARQ-ACK may correspond to the PDSCH decoding success determined based on embedded cyclic redundancy check(s) CRC(s), and may be ACK or NACK. The set of candidate PDSCH reception occasions may also be determined based on a set of start and length indicators (SLIVs) corresponding to each DL slot belonging to the set of DL slots. The set of DL slots may include all the unique DL slots that can be scheduled by any row index r of a time domain resource assignment (TDRA) table in DCI indicating the UL slot as HARQ-ACK feedback timing. In addition, the set of SLIVs corresponding to a DL slot (belonging to the set of DL slots) at least include all the SLIVs that can be scheduled within the DL slot by any row index r of the TDRA table in DCI indicating the UL slot as HARQ-ACK feedback timing.

PDSCH time domain resource allocation is described in 3GPP. One example may include a single PDSCH scheduling. Here, DCI may be restricted to schedule a single PDSCH. The DCI scheduling PDSCH may include a TDRA field value, which indicates a row on the related time domain resource allocation table (UE may be provided with multiple TDRA tables). The row of the TDRA table may provide a slot offset between the DCI and the PDSCH. In addition, the SLIV may determine the PDSCH start symbol and duration within the slot, and the PDSCH mapping type. In some cases, the TDRA table may directly provide the PDSCH start symbol S and length L. The SLIV value may depend on the PDSCH start symbol S and length L by the following:

if $(L-1) \leq 7$ then $$SLIV = 14 \cdot (L-1) + S$$

else $$SLIV = 14 \cdot (14-L+1) + (14-1-S)$$

where $0 < L \leq 14 - S$

PDSCH time domain resource allocation may also involve multi-PDSCH scheduling. Here, scheduling of multiple PDSCHs by a single DCI may be introduced. For a DCI that can schedule multiple PDSCHs, the TDRA table may be extended such that each row indicates up to 8 multiple PDSCHs (that can be non-continuous in the time-domain). Each PDSCH may have a separate SLIV and mapping type. The number of scheduled PDSCHs may be implicitly indicated by the number of indicated valid SLIVs in the row of the TDRA table signaled in DCI. In some cases, this does not preclude continuous resource allocation in the time-domain. Based on the above, a TDRA row may include multiple SLIVs, where each SLIV indicates scheduling of PDSCH.

NR supports 3 CB types for PDSCH HARQ-ACK. A type 1 CB is semi-static. In particular, a type 1 CB contains bit locations for HARQ-ACKs for all potential PDSCHs for which HARQ-ACK may be reported on the UL slot where the CB is transmitted. NACK is inserted to the CB bit locations for which UE did not detect any corresponding PDSCH. Additionally, type 1 CB determination may be robust, but at a size of unnecessarily large size.

Type 2 CB is dynamic In particular, type 2 CB may include HARQ-ACKs only for PDSCHs that the UE detects to be scheduled based on DCI information. Additionally, type 3 CB includes the latest HARQ-ACK for all HARQ processes. It may be triggered to recover missing HARQ-ACK information.

As noted above, type 1 CB may include bit locations for HARQ-ACKs for all potential PDSCHs for which HARQ-ACK may be reported on the UL slot. The bit location may correspond to the bit position(s) on the CB for HARQ-ACKs of corresponding PDSCH. In some cases, one or more multiple HARQ-ACK bits may be reported for a single PDSCH (e.g., when two transport blocks (TBs) or a code block group (CBG) based operation is configured). As such, a bit location may be understood as a location (or container) for all the HARQ-ACK bit(s) for the PDSCH.

To determine the CB, HARQ-ACK bit locations may be created for each potential PDSCH occasions, or candidate PDSCH occasion. To determine the candidate PDSCH occasions, the slots for candidate PDSCHs may be determined based on K1 slot timing values relative to the slot on which the HARQ-ACK CB is transmitted. In the case of multi-PDSCH scheduling, the TDRA rows scheduling multiple PDSCHs may also be taken into account in the determination of candidate PDSCH slots The K1 slot timing values may correspond to a set of slot timing values K1, defining the slot offset between PDSCH and HARQ-ACK feedback. In addition, the set of slot timing values K1 may be predefined or configured to the UE with dl-DataToUL-ACK. As discussed herein, K1 indicates the slot offset between the last PDSCH scheduled by the DCI and the slot on which HARQ feedback is transmitted. Thus, K1 alone is not sufficient for candidate PDSCH slot determination.

In type 1 CB, candidate PDSCH slots may be pruned by removing the candidates that overlap with semi-static UL resources. Additionally, in cases where the UE supports multiple PDSCHs per slot, multiple candidate PDSCH occasions may be introduced for each candidate PDSCH slot. Otherwise, there may be a single HARQ-ACK bit location per candidate PDSCH slot. The assignment of multiple candidate PDSCH occasions for each candidate PDSCH slot may be accomplished by determining the maximum number of PDSCHs on a single slot that are not overlapping in time based on SLIVs on the TDRA table (the symbols that a PDSCH occupies on a slot may be determined based on SLIV). This may occasionally be referred to as SLIV pruning. In the case that the UE supports a single PDSCH per slot, candidate PDSCH occasions may equal to candidate PDSCH slots.

The candidate PDSCH occasions may be ordered in a predefined manner Additionally, a corresponding sequence of NACKs may be created, forming an initial CB. When the UE has detected a PDSCH, the HARQ-ACK information may be entered to the bit location (i.e., on the sequence) of the corresponding candidate PDSCH occasion, replacing the NACK value. Additionally, the order of inserting HARQ-ACKs and NACKs may differ. Further, the HARQ-ACK CB may be transmitted on a physical uplink control channel (PUCCH) or PUSCH.

HARQ-ACK bits may be bundled together. For example, HARQ-ACK bundling may be performed to reduce HARQ-ACK feedback size by compressing multiple HARQ-ACK bits into a single HARQ-ACK bit. This may be done by taking logical and over the bundled HARQ-ACK bits (ACK is reported only if all bundled bits are ACKs. Otherwise NACK is reported). Additionally, HARQ-ACK bundling may be performed over PDSCHs in time, frequency, and/or spatial domain, and HARQ-ACK bundling over spatially multiplexed PDSCHs is supported.

Due to long PDSCH processing time at the UE (relative to symbol duration) on 480 or 960 kHz, subcarrier spacing (SCS), it may be desired to support a further HARQ-ACK compression mechanism. The time domain HARQ-ACK bundling over the PDSCHs or a subset of PDSCHs scheduled by the same DCI may be a desirable mechanism. By limiting the HARQ-ACK bundling to the PDSCHs scheduled by the same DCI, it may be possible to avoid error cases caused by the UE failing to detect all DCIs scheduling PDSCHs to be bundled. Furthermore, configuration of the PDSCH subset to be bundled may allow for better control of the amount of HARQ-ACK compression applied. It may be expected that HARQ-ACK bundling is enabled or disabled, for example, when multi-PDSCH scheduling is configured. Further, a predetermined algorithm and/or configuration parameter may be used to determine the PDSCHs over which the HARQ-ACK bundling may be performed. Thus, to obtain the targeted benefit from the HARQ-ACK bundling, that is, reduced HARQ feedback size, HARQ-ACK bundling may be taken into account in the determination type 1 CB. However, doing this efficiently may be challenging.

Certain example embodiments may provide a mechanism to incorporate time-domain HARQ-ACK bundling in the determination of type 1 CB in the case of multi-PDSCH scheduling. For instance, in certain example embodiments, for each row of the TDRA table containing multiple SLIVs, the UE may determine the sets of PDSCHs for which HARQ-ACK is bundled. The HARQ-ACKs for a single set of PDSCHs may be bundled together. Additionally, there may be one or more PDSCH sets per TDRA row. According to other example embodiments, the UE may determine (tentative) candidate PDSCH slots based on K1 values and the TDRA table. That is, the candidate PDSCH may change. In further example embodiments, the UE may prune the candidate PDSCH slots and the associated SLIVs by removing PDSCH slots and SLIVs that overlap with any semi-static UL resource.

In certain example embodiments, the UE may reduce the set of candidate PDSCH slots. For instance, for each K1 value, for each TDRA row and for each set of PDSCHs, the UE may select one SLIV (PDSCH) from that TDRA row that is kept on the TDRA table. The SLIV values that are not selected may be removed from the TDRA row. In other example embodiments, the UE may determine candidate PDSCH occasions for type 1 CB generation based on the reduced set of candidate PDSCH slots and associated SLIV values. According to certain example embodiments, determination of the candidate PDSCH occasions by the UE may include defining a single candidate PDSCH occasion for every candidate PDSCH slot. When there are multiple PDSCHs per slot, the UE may determine non-overlapping candidate PDSCH occasions for each candidate PDSCH slot based on the associated SLIV values by the use of (known) SLIV pruning.

Certain example embodiments may provide multiple ways of selecting the SLIV that is kept on the reduced TDRA table. For instance, in one example embodiment, the last SLIV from the set of SLIVs (corresponding to the set of PDSCHs) may be kept. In another example embodiment, the last SLIV from the set of SLIVs that are associated with a predetermined subset of extended K1 set values may be selected. Here, the extended K1 set may include the slot offset values between the candidate PDSCH slots and HARQ-ACK feedback slot. In addition, the extended K1 set may be determined based on the set slot timing values K1 and TDRA rows. According to certain example embodiments, the predetermined subset may be, for example, odd or even values of the extended K1 set. In addition, the determination of the subset may be configured to the UE. In other words, the UE may be configured to determine the subset.

In other example embodiments, the last N SLIVs of the TDRA row (e.g., pruned TDRA row) may be selected. In this case, N may represent the number of SLIV sets (or bundled HARQ-ACKs) for that TDRA row. According to certain example embodiments, the last SLIV set may be associated with the last selected SLIV, and the second to last SLIV set may be associated with the second to last selected SLIV. Thus, in certain example embodiments, the corresponding type 1 CB determination may also be performed on the gNB to ensure correct detection and interpretation of received HARQ-ACK feedback.

As described herein, a setup for certain example embodiments may include a K1 set of {1, 2, 3, 4, 6}, and a TDRA table containing 4 rows scheduling 1, 2, 4, or 8 PDSCHs. The K1 set may be extended with TDRA rows as K1_ext={1, 2, 3, . . . , 13}, and the SLIVs may result in a single PDSCH candidate per slot (i.e., TDRA configuration does not support scheduling of multiple non-overlapping PDSCHs per slot). Additionally, for certain example embodiments, one HARQ-ACK bit may be generated per PDSCH, and HARQ-ACK bundling (when used) may be performed over 2 or more consecutive PDSCHs. In other example embodiments, the K1 set, SLIVs, and TDRA configuration may differ from the setup described above.

FIG. 1 illustrates an example candidate PDSCH occasion determination. In particular, the example of FIG. 1 is of a candidate PDSCH occasion determination without any HARQ-ACK bundling. In FIG. 1, determination of PDSCH candidate occasions is illustrated with TDRA table offset with different K1 values. In FIG. 1, HARQ-ACK bundling is not assumed. Further, since there are 13 candidate PDSCH occasions, and 1 HARQ-ACK bit is reported per candidate PDSCH occasion, the type 1 CB size is 13 bits.

Figure 2:
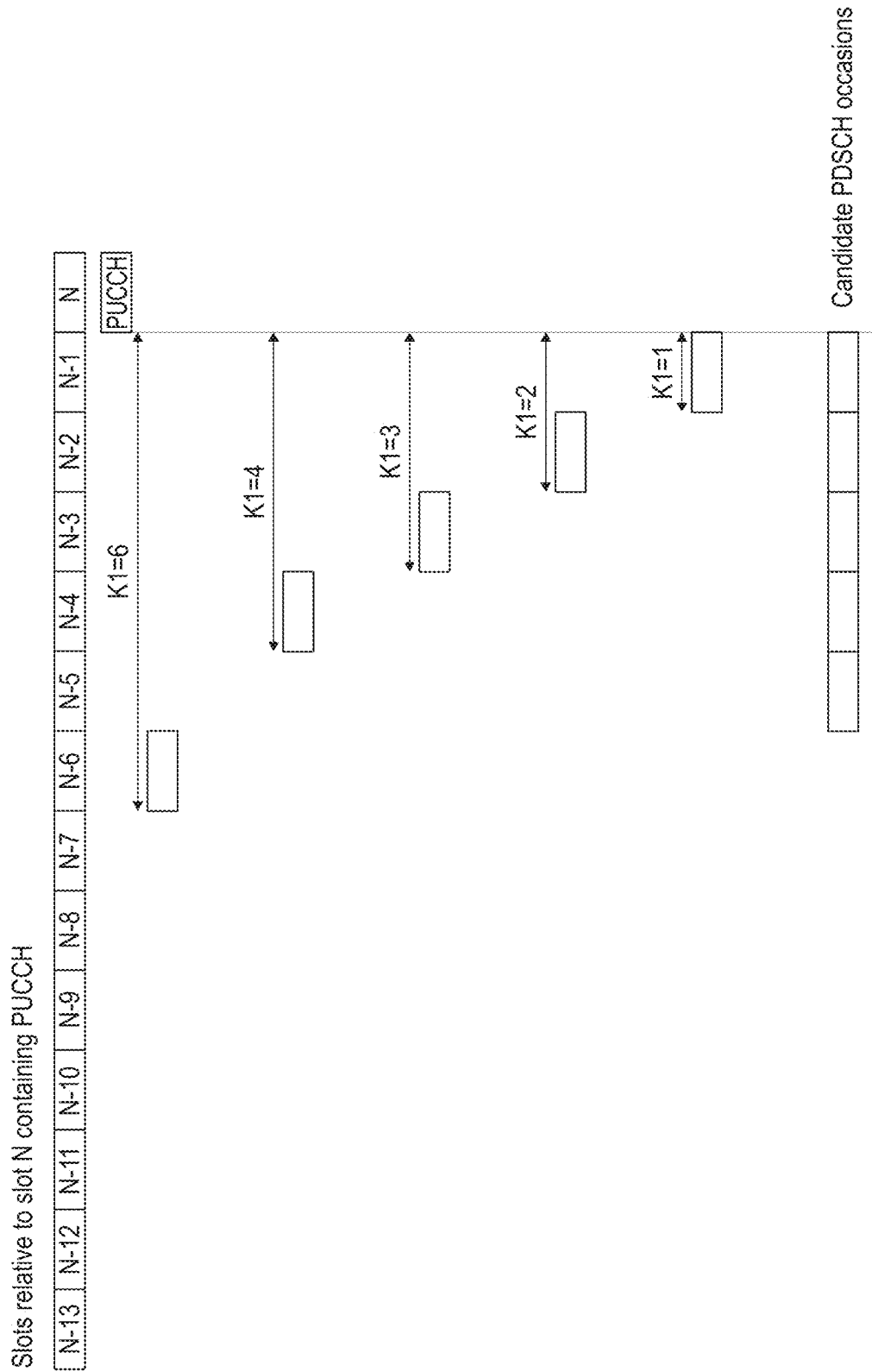
FIG. 2 illustrates an example of a conventional candidate PDSCH occasion determination.

FIG. 2 illustrates an example of a conventional candidate PDSCH occasion determination. In particular, the example of FIG. 2 is of a candidate PDSCH occasion determination for HARQ-ACK bundling. As illustrated in FIG. 2, the candidate PDSCH occasions correspond to the K1 values. Since there can be up to 4 sets of bundled PDSCHs (8/2=4), 4 HARQ-ACK bits may be reported for each candidate PDSCH occasion. In addition, since there are 5 candidate PDSCH occasions, the type 1 CB size is 20 bits. This also highlights the shortcomings of the conventional solution illustrated in FIG. 2. That is, for the considered example, the HARQ-ACK bundling does not decrease the CB size (as targeted), but actually increases the CB size from 13 bits to 20 bits.

Figure 3:
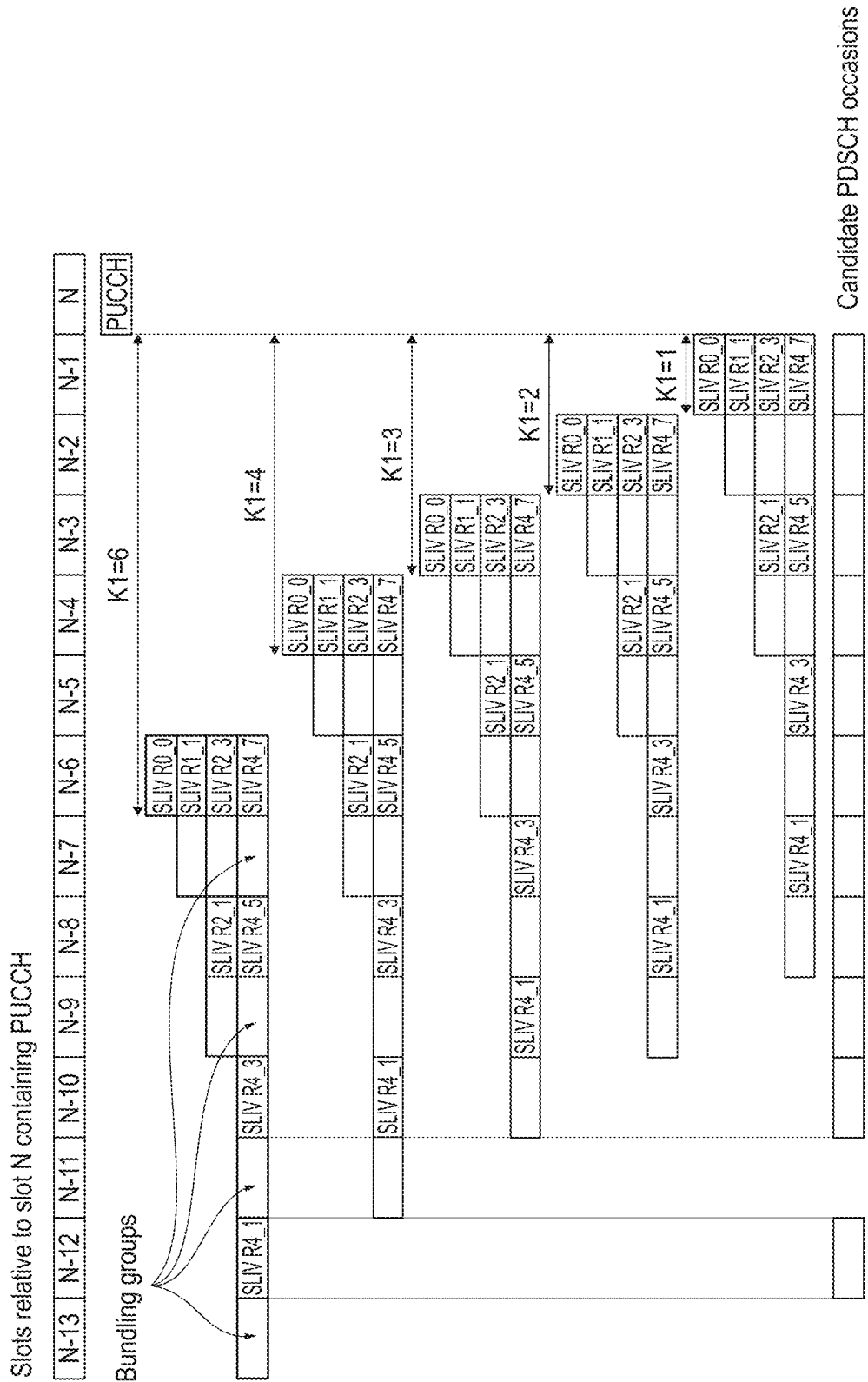
FIG. 3 illustrates an example of another candidate PDSCH occasion determination, according to certain example embodiments.

FIG. 3 illustrates an example of another candidate PDSCH occasion determination, according to certain example embodiments. In particular, the example of FIG. 3 is of a candidate PDSCH occasion determination where the last SLIV from each set of SLIVs is selected. For example, the last SLIV may be associated to the PDSCH that occurs latest in time from the corresponding set of PDSCHs. Furthermore, the example of FIG. 3 illustrates that the set of SLIVs or bundling groups (of 2 consecutive PDSCHs) are shown for the TDRA table with the K1=6 offset. In addition, the example of FIG. 3 illustrates that the SLIV values that are not selected are removed from the TDRA table(s) (e.g., shown as the empty boxes in the TDRA table with K1=1, 2, 3, 4, and 6). According to certain example embodiments, the candidate PDSCH occasions may be determined based on the selected (remaining) SLIV values. As there are 11 candidate PDSCH occasions in the example of FIG. 3, the type 1 CB size is 11 bits. In the example of FIG. 3, it may be possible to provide a small reduction on the CB size (e.g., from 13 bits to 11 bits). However, more significant CB size reduction may be achieved with different configurations including, for example, when HARQ-ACK bundling is performed over a larger number of PDSCHs than 2.

Figure 4:
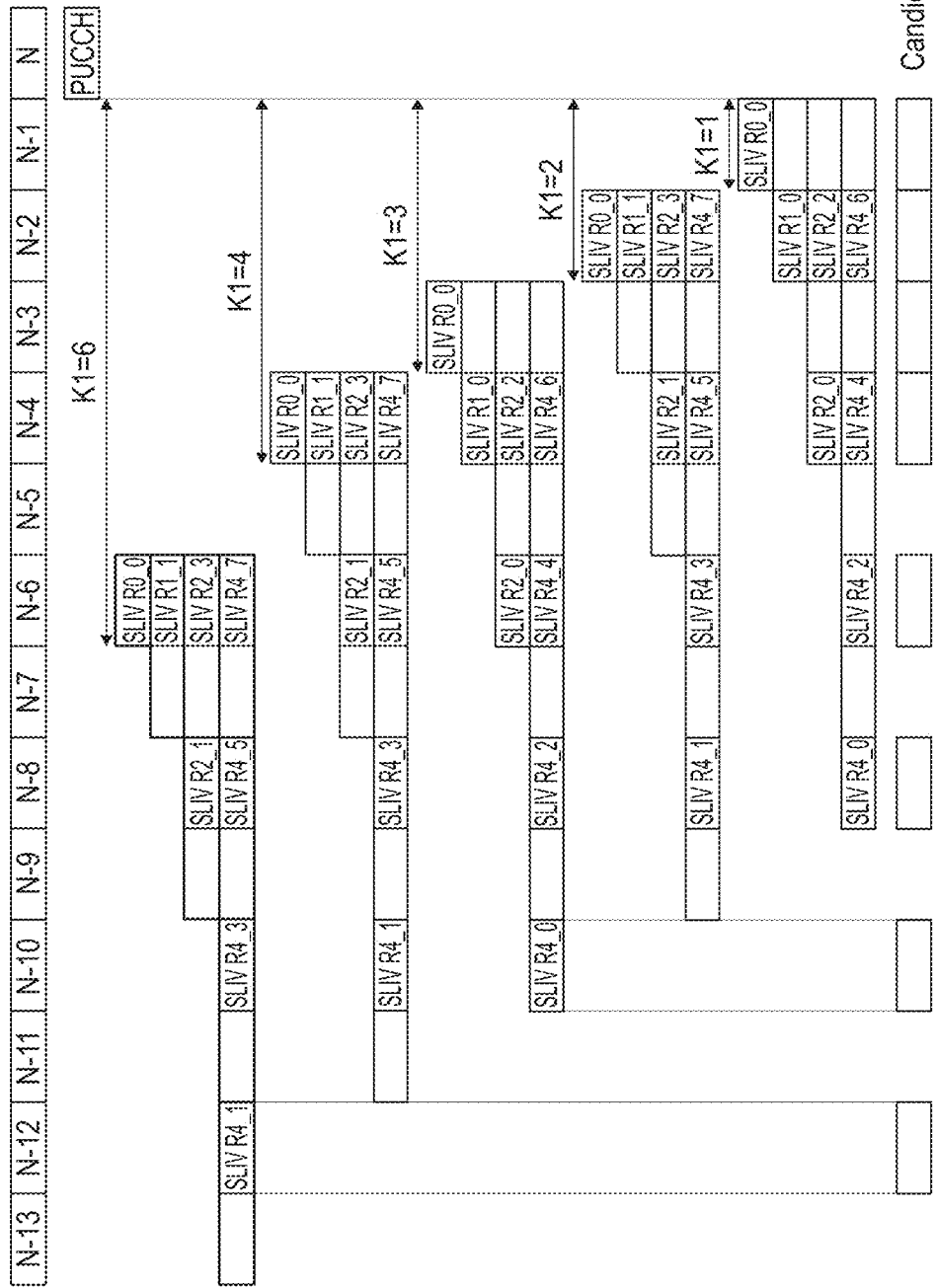
FIG. 4 illustrates an example of a further candidate PDSCH occasion determination, according to certain example embodiments.

FIG. 4 illustrates an example of a further candidate PDSCH occasion determination, according to certain example embodiments. In particular, the example of FIG. 4 is of a candidate PDSCH occasion determination from each set of SLIVs, the last SLIV that belong to a predetermined subset of extended K1 set is selected. As illustrated in the example of FIG. 4, the predetermined subset of the extended K1 set is represented by the even numbers of the extended K1 values. In the example of FIG. 4, the last SLIV from the set of SLIVs that belong to a predetermined subset of the extended K1 set is selected. The predetermined subset of the extended K1 set is the even numbers of the extended K1 values in this example. In certain example embodiments, the subset may be determined by selecting every Mth value of the extended K1 value. Since there are 8 candidate PDSCH occasions, a type 1 CB size of 8 bits is achieved.

Figure 5:
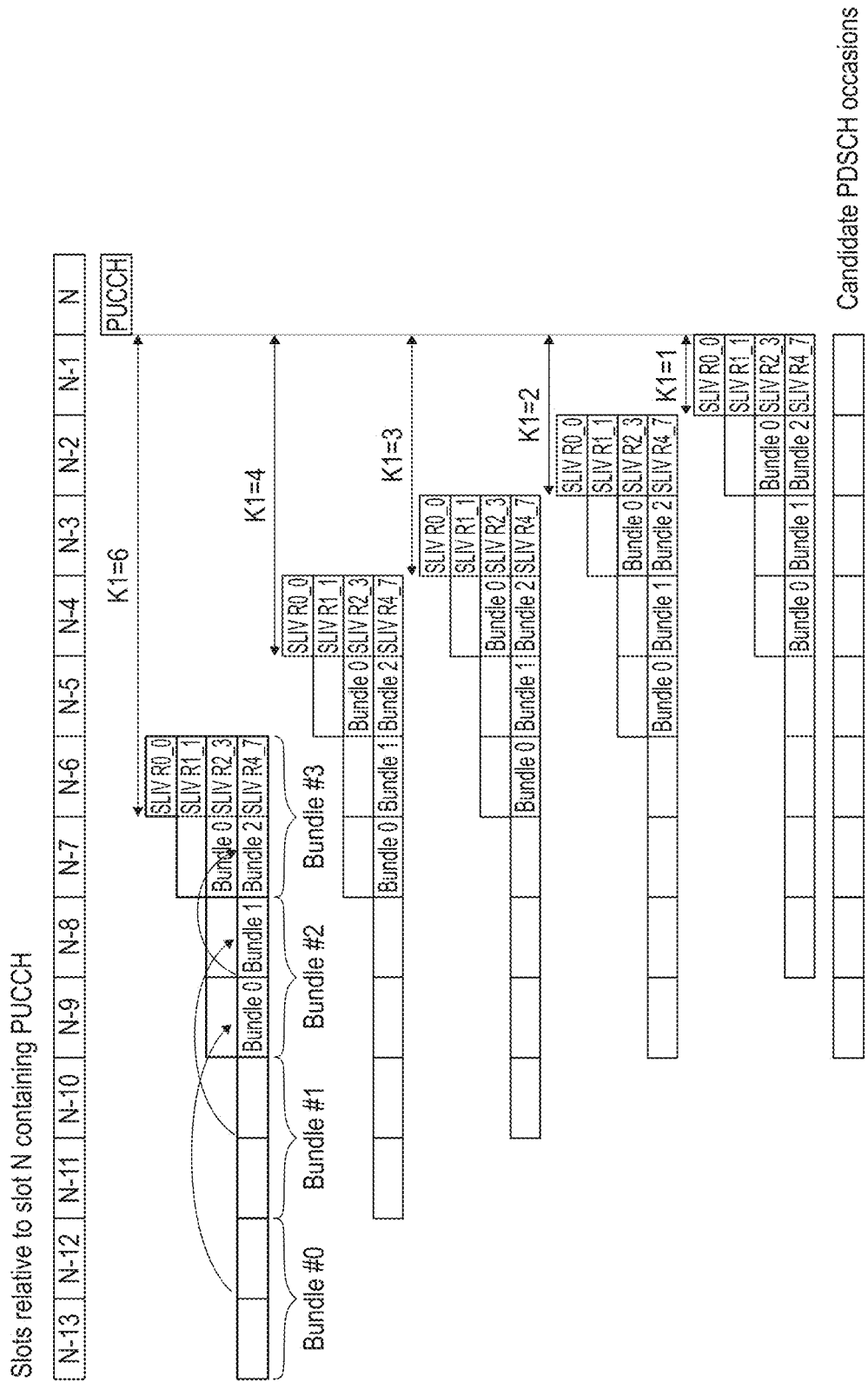
FIG. 5 illustrates an example of yet another candidate PDSCH occasion determination, according to certain example embodiments.

FIG. 5 illustrates an example of yet another candidate PDSCH occasion determination, according to certain example embodiments. In particular, the example of FIG. 5 is of a candidate PDSCH occasion determination where the last N SLIVs of the TDRA row are selected, where N is the number of SLIV sets (or bundled HARQ-ACKs) for that TDRA row. In the example embodiments illustrated in FIGS. 3 and 4, the SLIV is selected from the corresponding set of SLIVs. However, in the example embodiment illustrated in FIG. 5, the selection of the SLIV is not limited to the corresponding set of SLIVs, but may be selected among the SLIVs on the corresponding TDRA row. As seen in FIG. 5, the last SLIVs of the TDRA row are selected. Further, in FIG. 5, the mapping of the bundled HARQ-ACK for the sets of SLIVs to the selected last N SLIVs of the TDRA row are illustrated with arrows for the last ($4^{th}$) TDRA row on the TDRA table with K1=6 offset. Since the example of FIG. 5 results in 9 candidate PDSCH occasions, the type 1 CB size of the 8 bits is also achieved in this case.

In certain example embodiments, pruning with the semi-static DL/UL pattern may be done before the SLIV selection for the SLIV/PDSCH sets with the bundled HARQ-ACK. In this case, the invalid SLIVs (i.e., overlapping with semi-static UL resources) may be removed from the TDRA table for the current K1 value in the type 1 CB determination. SLIV is valid when it is not overlapping with semi-static UL resources. Allocation of the pruned TDRA row may be considered valid as long as there remains at least one valid SLIV. In certain example embodiments, the set of SLIVs/ PDSCHs may be considered valid (HARQ-ACK is produced for it) as long as there remains at least one valid SLIV after the pruning with the semi-static DL/UL pattern.

According to certain example embodiments, the pruning with the semi-static UL/DL pattern as well as the SLIV pruning (that is pruning of multiple candidate PDSCH occasions within the same slot) may be optional (or even not supported) in the case of multiple PDSCH scheduling with a single DCI. In certain example embodiments, if there is no pruning with the semi-static UL/DL pattern, it may be enough to determine the set of candidate PDSCH occasions only once after the configuration of the TDRA table and K1 values. In such a case, it may not be necessary to loop over K1 values in certain example embodiments.

Figure 6:
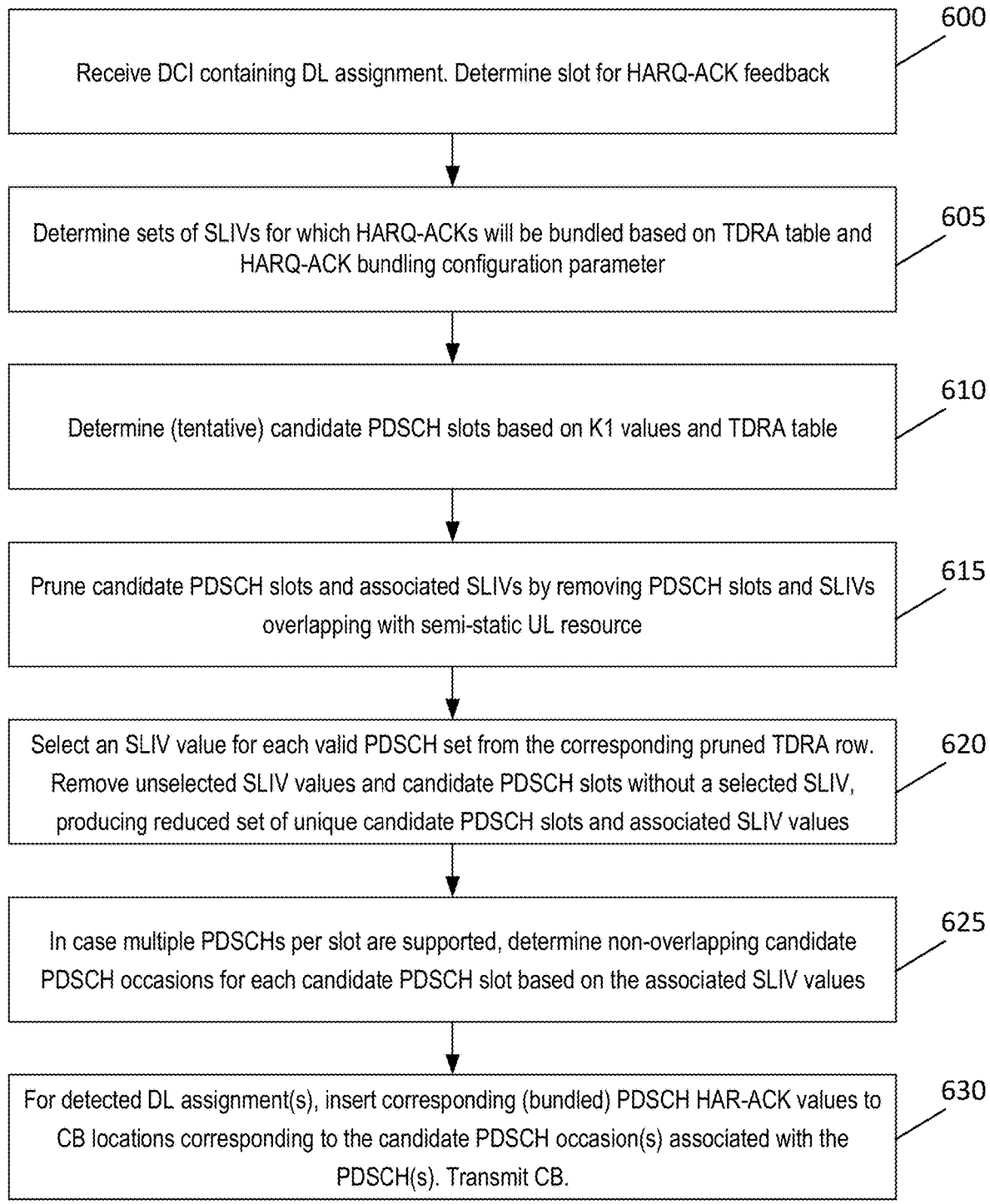
FIG. 6 illustrates a flow diagram of a method, according to certain example embodiments.

FIG. 6 illustrates a flow diagram of a method, according to certain example embodiments. In particular, the flow diagram of FIG. 6 is for type 1 CB determination with HARQ-ACK bundling for multi-PDSCH scheduling. At 600, the UE may receive a DCI containing a DL assignment, and the UE may determine a slot for HARQ-ACK feedback. According to certain example embodiments, based on the DL assignment, the UE may be expected to receive at least one transmission on at least one of the candidate communication channel slots or occasions. At 605, the UE may determine sets of SLIVs for which HARQ-ACKs may be bundled based on the TDRA table and HARQ-ACK bundling configuration parameter. At 610, the UE may determine (tentative) candidate PDSCH slots based on K1 values and the TDRA table. At 615, the UE may prune the candidate PDSCH slots and associated SLIVs by removing PDSCH slots and SLIVs overlapping with the semi-static UL resource. At 620, the UE may select an SLIV value for each valid PDSCH set from the corresponding pruned TDRA row. The UE may also remove any unselected SLIV values and candidate PDSCH slots without a selected SLIV, producing a reduced set of unique candidate PDSCH slots and associated SLIV values.

At 625, in case multiple PDSCHs per slot are supported, the UE may determine non-overlapping candidate PDSCH occasions for each candidate PDSCH slot based on the associated SLIV values. At 630, for detected DL assignment(s), the UE may insert the corresponding (bundled) PDSCH HARQ-ACK value(s) to CB location(s) corresponding to the candidate PDSCH occasion(s) associated with the PDSCH(s). The UE may insert NACK(s) to the remaining CB location(s). The UE may then transmit the CB to a gNB on PUCCH or PUSCH based on PUSCH scheduling or a PUCCH resource indication received from the gNB.

Figure 7:
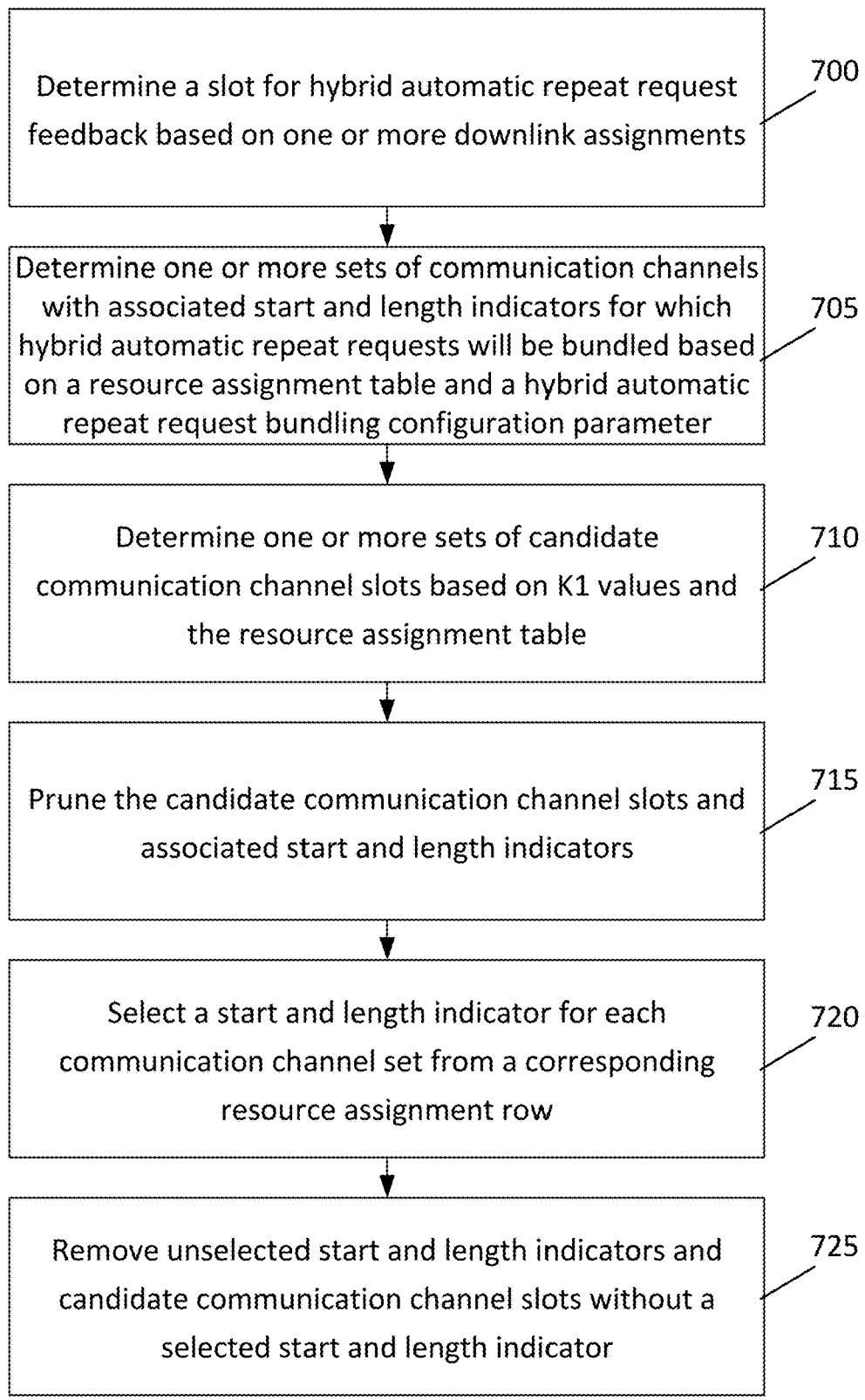
FIG. 7 illustrates a flow diagram of another method, according to certain example embodiments.

FIG. 7 illustrates an example flow diagram of another method, according to certain example embodiments. In an example embodiment, the method of FIG. 7 may be performed by a network entity, network node, or a group of multiple network elements in a 3GPP system, such as LTE or 5G-NR. For instance, in an example embodiment, the method of FIG. 6 may be performed by a UE including, for example, similar to apparatuses 10 or 20 illustrated in FIGS. 8(a) and 8(b).

According to certain example embodiments, the method of FIG. 7 may include, at 700, determining a slot for hybrid automatic repeat request feedback based on a downlink assignment. At 705, the method may include determining one or more sets of start and length indicators for which hybrid automatic repeat requests (e.g., HARQ-ACK) will be bundled based on a resource assignment table and a hybrid automatic repeat request bundling configuration parameter. At 710, the method may include determining one or more sets of candidate communication channel slots based on K1 values and the resource assignment table. At 715, the method may include pruning the candidate communication channel slots and associated start and length indicators. At 720, the method may include selecting a start and length indicator for each communication channel set from a corresponding resource assignment row. At 725, the method may include removing unselected start and length indicators and candidate communication channel slots without a selected start and length indicator According to certain example embodiments, the pruning may include removing the communication channel slots and the start and length indicators that overlap with a semi-static uplink resource. According to other example embodiments, selection of the start and length indicator may include selecting a last start and length indicator to be kept. In certain example embodiments, the selection is made from the one or more sets of start and length indicators. According to some example embodiments, the method may further include selecting a last start and length indicator to be kept. In certain example embodiments, the selection may be made from the one or more sets of start and length indicators that are associated with a predetermined subset of extended K1 set values.

In some example embodiments, selection of the start and length indicator may include selecting last start and length indicators from the resource assignment row, wherein the number of selected last start and length indicators may be determined by the number of communication channel sets. In other example embodiments, when a plurality of communication channels per slot are supported, the method may further include determining non-overlapping candidate communication channel occasions for each candidate communication channel slot based on the associated start and length indicators. In other example embodiments, when the plurality of communication channels per slot are not supported, the method may further include determining a candidate communication channel occasion for each of the candidate communication channel slots. In further example embodiments, the method may also include inserting at least one bundled communication channel hybrid automatic repeat request value to a codebook location corresponding to the candidate communication channel occasion associated with a communication channel assigned by the downlink assignment.

Figure 8A:
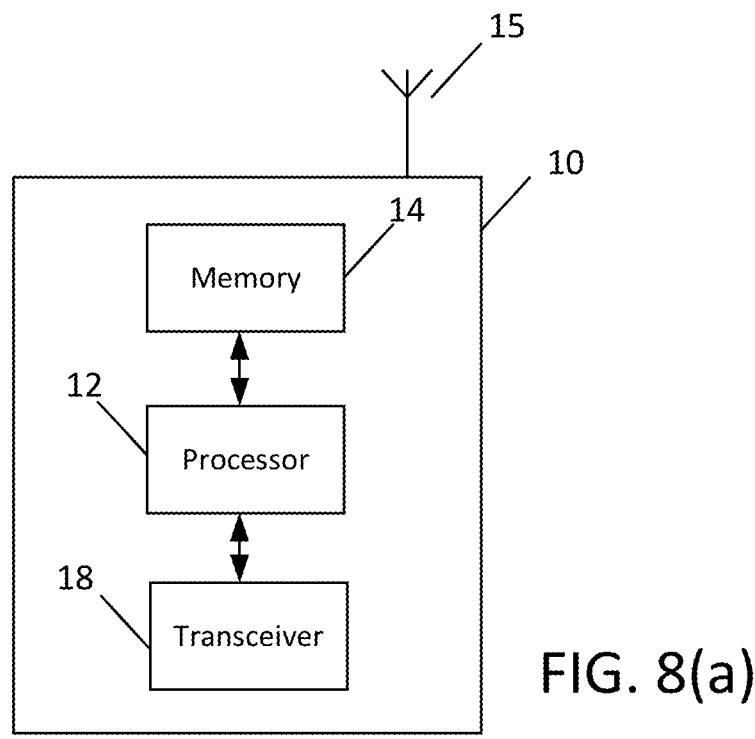
FIG. 8(a) illustrates an apparatus, according to certain example embodiments.

FIG. 8(a) illustrates an apparatus 10 according to certain example embodiments. In certain example embodiments, apparatus 10 may be a node or element in a communications network or associated with such a network, such as a UE (e.g., reference UE or target UE), mobile equipment (ME), mobile station, mobile device, stationary device, or other device. It should be noted that one of ordinary skill in the art would understand that apparatus 10 may include components or features not shown in FIG. 8(a).

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 8(a).

As illustrated in the example of FIG. 8(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8(a), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-7.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-7.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to determine a slot for hybrid automatic repeat request feedback based on one or more downlink assignments. Apparatus 10 may also be controlled by memory 14 and processor 12 to determine one or more sets of communication channels with associated start and length indicators for which hybrid automatic repeat requests will be bundled based on a resource assignment table and a hybrid automatic repeat request bundling configuration parameter. Apparatus 10 may further be controlled by memory 14 and processor 12 to determine one or more sets of candidate communication channel slots based on K1 values and the resource assignment table. In addition, apparatus 10 may be controlled by memory 14 and processor 12 to prune the set of candidate communication channel slots and associated start and length indicators. Further, apparatus 10 may be controlled by memory 14 and processor 12 to select a start and length indicator for each communication channel set from a corresponding resource assignment row. Apparatus 10 may also be controlled by memory 14 and processor 12 to remove unselected start and length indicators and candidate communication channel slots without a selected start and length indicator.

Figure 8B:
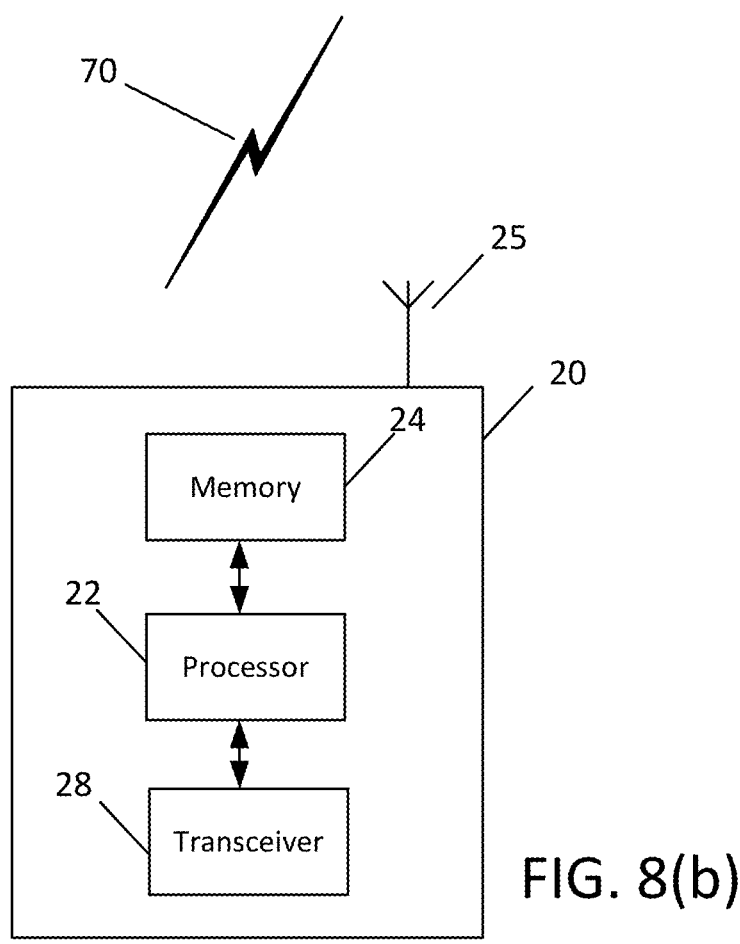
FIG. 8(b) illustrates another apparatus, according to certain example embodiments.

FIG. 8(b) illustrates an apparatus 20 according to certain example embodiments. In certain example embodiments, the apparatus 20 may be a node or element in a communications network or associated with such a network, such as a base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 8(b).

As illustrated in the example of FIG. 8(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8(b), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-5.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-5.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for determining a slot for hybrid automatic repeat request feedback based on one or more downlink assignments. The apparatus may also include means for determining one or more sets of communication channels with associated start and length indicators for which hybrid automatic repeat requests will be bundled based on a resource assignment table and a hybrid automatic repeat request bundling configuration parameter. The apparatus may further include means for determining one or more sets of candidate communication channel slots based on K1 values and the resource assignment table. In addition, the apparatus may include means for pruning the set of candidate communication channel slots and associated start and length indicators. Further, the apparatus may include means for selecting a start and length indicator for each communication channel set from a corresponding resource assignment row. The apparatus may also include means for removing unselected start and length indicators and candidate communication channel slots without a selected start and length indicator.

Certain example embodiments described herein provide several technical improvements, enhancements, and/or advantages. In some example embodiments, it may be possible to allow for the use of HARQ-ACK bundling on type 1 CB with multi-PDSCH scheduling, providing efficient and flexible CB size compression in a reliable manner and, thus, reduce errors on HARQ feedback detection and/or increase UL coverage for HARQ feedback. Additionally, more efficient use of UL resources can be achieved.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

3GPP 3rd Generation Partnership Project
5G 5th Generation
5 GCN 5G Core Network
ACK Acknowledge
BS Base Station
CBG Code Block Group
DCI Downlink Control Information
DL Downlink
eNB Enhanced Node B
gNB 5G or Next Generation NodeB
HARQ Hybrid Automatic Repeat Request
LTE Long Term Evolution
NACK Negative Acknowledgement
NR New Radio
PDCCH Physical Downlink Control Channel
PDSCH Physical Downlink Shared Channel
PUCCH Physical Uplink Control Channel
PUSCH Physical Uplink Shared Channel
SCS Subcarrier Spacing
SLIV Start and Length Indicator
TB Transport Block
TDRA Time Domain Resource Allocation
UE User Equipment
UL Uplink

I claim:

1. A method, comprising:
   determining a slot for hybrid automatic repeat request feedback based on one or more downlink assignments;
   determining one or more sets of communication channels with associated start and length indicators for which hybrid automatic repeat requests will be bundled based on a resource assignment table and a hybrid automatic repeat request bundling configuration parameter;
   determining one or more sets of candidate communication channel slots based on K1 values and the resource assignment table;
   selecting a start and length indicator for each communication channel set from a corresponding resource assignment row; and
   removing unselected start and length indicators and candidate communication channel slots without a selected start and length indicator.

2. The method according to claim 1, further comprising:
   pruning the set of candidate communication channel slots and associated start and length indicators.

3. The method according to claim 2, wherein the pruning comprises removing the communication channel slots and the start and length indicators that overlap with a semi-static uplink resource.

4. The method according to claim 1, wherein selection of the start and length indicator comprises:
   selecting a last start and length indicator to be kept,
   wherein the selection is made from each set of start and length indicators.

5. The method according to claim 1, wherein selection of the start and length indicator comprises:
   selecting a last start and length indicator to be kept,
   wherein the selection is made from the one or more sets of start and length indicators that are associated with a predetermined subset of extended K1 set values.

6. The method according to claim 1, wherein selection of the start and length indicator comprises:
selecting last start and length indicators from the resource assignment row,
wherein the number of selected last start and length indicators is determined by the number of communication channel sets.

7. The method according to claim 1,
wherein when a plurality of communication channels per slot are supported, the method further comprises determining non-overlapping candidate communication channel occasions for each candidate communication channel slot based on the associated start and length indicators, and
wherein when the plurality of communication channels per slot are not supported, the method further comprises determining a candidate communication channel occasion for each of the candidate communication channel slots.

8. The method according to claim 7, further comprising:
inserting at least one bundled communication channel hybrid automatic repeat request value to a codebook location corresponding to the candidate communication channel occasion associated with a communication channel assigned by the downlink assignment.

9. An apparatus, comprising:
at least one processor; and
at least one memory comprising computer program code, the at least one memory and the computer program code are configured, with the at least one processor, to cause the apparatus at least to
determine a slot for hybrid automatic repeat request feedback based on one or more downlink assignments;
determine one or more sets of communication channels with associated start and length indicators for which hybrid automatic repeat requests will be bundled based on a resource assignment table and a hybrid automatic repeat request bundling configuration parameter;
determine one or more sets of candidate communication channel slots based on K1 values and the resource assignment table;
select a start and length indicator for each communication channel set from a corresponding resource assignment row; and
remove unselected start and length indicators and candidate communication channel slots without a selected start and length indicator.

10. The apparatus according to claim 9, wherein the at least one memory and the computer program code are further configured, with the at least one processor, to cause the apparatus at least to:
prune the set of candidate communication channel slots and associated start and length indicators.

11. The apparatus according to claim 9, wherein the candidate communication channel slots and the associated start and length indicators are pruned by removing the communication channel slots and the start and length indicators that overlap with a semi-static uplink resource.

12. The apparatus according to claim 9,
wherein the start and length indicator is selected by selecting a last start and length indicator to be kept, and
wherein the selection is made from each set of start and length indicators.

13. The apparatus according to claim 9,
wherein the start and length indicator is selected by selecting a last start and length indicator to be kept, and
wherein the selection is made from the one or more sets of start and length indicators that are associated with a predetermined subset of extended K1 set values.

14. The apparatus according to claim 9,
wherein the start and length indicator is selected by selecting last start and length indicators from the resource assignment row, and
wherein the number of selected last start and length indicators is determined by the number of communication channel sets.

15. The apparatus according to claim 9, wherein the at least one memory and the computer program code are further configured, with the at least one processor, to cause the apparatus at least to:
when a plurality of communication channels per slot are supported, determine non-overlapping candidate communication channel occasions for each candidate communication channel slot based on the associated start and length indicators, and
when the plurality of communication channels per slot are not supported, determine a candidate communication channel occasion for each of the candidate communication channel slots.

16. The apparatus according to claim 15, wherein the at least one memory and the computer program code are further configured, with the at least one processor, to cause the apparatus at least to:
insert at least one bundled communication channel hybrid automatic repeat request value to a codebook location corresponding to the candidate communication channel occasion associated with a communication channel assigned by the downlink assignment.

17. A computer program embodied on a non-transitory computer readable medium, the computer program comprising computer executable code which, when executed by a processor, causes the processor to:
determine a slot for hybrid automatic repeat request feedback based on one or more downlink assignments;
determine one or more sets of communication channels with associated start and length indicators for which hybrid automatic repeat requests will be bundled based on a resource assignment table and a hybrid automatic repeat request bundling configuration parameter;
determine one or more sets of candidate communication channel slots based on K1 values and the resource assignment table;
select a start and length indicator for each communication channel set from a corresponding resource assignment row; and
remove unselected start and length indicators and candidate communication channel slots without a selected start and length indicator.

18. The computer program according to claim 17, wherein when the computer program is executed by the processor, the processor is further caused to:
prune the set of candidate communication channel slots and associated start and length indicators.

19. The computer program according to claim 17, wherein the candidate communication channel slots and the associated start and length indicators are pruned by removing the communication channel slots and the start and length indicators that overlap with a semi-static uplink resource.

20. The computer program according to claim 17,
wherein the start and length indicator is selected by selecting a last start and length indicator to be kept, and
wherein the selection is made from each set of start and length indicators.

21. The computer program according to claim 17,
wherein the start and length indicator is selected by selecting a last start and length indicator to be kept, and
wherein the selection is made from the one or more sets of start and length indicators that are associated with a predetermined subset of extended K1 set values.

22. The computer program according to claim 17,
wherein the start and length indicator is selected by selecting last start and length indicators from the resource assignment row, and
wherein the number of selected last start and length indicators is determined by the number of communication channel sets.

23. The computer program according to claim 17, wherein the computer program is executed by the processor to:
when a plurality of communication channels per slot are supported, determine non-overlapping candidate communication channel occasions for each candidate communication channel slot based on the associated start and length indicators and
when the plurality of communication channels per slot are not supported, determine a candidate communication channel occasion for each of the candidate communication channel slots.

24. The computer program according to claim 23, wherein the computer program is executed by the processor to:
insert at least one bundled communication channel hybrid automatic repeat request value to a codebook location corresponding to the candidate communication channel occasion associated with a communication channel assigned by the downlink assignment.

* * * * *